(12) United States Patent
Vangala et al.

(10) Patent No.: US 8,116,181 B2
(45) Date of Patent: Feb. 14, 2012

(54) APPARATUS FOR AND METHOD FOR RECORDING DATA ON A REWRITABLE OPTICAL RECORD CARRIER

(75) Inventors: Venkata Ramana Vangala, Singapore (SG); Avinash Jayaraman, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 482 days.

(21) Appl. No.: 12/094,457

(22) PCT Filed: Nov. 20, 2006

(86) PCT No.: PCT/IB2006/054334
§ 371 (c)(1),
(2), (4) Date: May 21, 2008

(87) PCT Pub. No.: WO2007/060593
PCT Pub. Date: May 31, 2007

(65) Prior Publication Data
US 2008/0285407 A1    Nov. 20, 2008

(30) Foreign Application Priority Data
Nov. 28, 2005    (EP) ..................................... 05111349

(51) Int. Cl.
*G11B 7/00* (2006.01)
(52) U.S. Cl. ............... 369/47.53; 369/47.17; 369/59.12; 369/59.24
(58) Field of Classification Search .......................... None
See application file for complete search history.

(56) References Cited

U.S. PATENT DOCUMENTS

| 6,134,209 | A | * | 10/2000 | Den Boef | 369/47.53 |
| 7,230,895 | B2 | * | 6/2007 | Sasaki et al. | 369/47.53 |
| 7,307,926 | B2 | * | 12/2007 | Kuwahara et al. | 369/44.29 |
| 7,474,599 | B2 | * | 1/2009 | Yamanaka | 369/53.21 |
| 7,554,890 | B2 | * | 6/2009 | Han | 369/47.53 |
| 2001/0038583 | A1 | * | 11/2001 | Miyagawa et al. | 369/47.17 |
| 2002/0036962 | A1 | | 3/2002 | Masaki et al. | |
| 2004/0000868 | A1 | | 1/2004 | Shimizu et al. | |

(Continued)

FOREIGN PATENT DOCUMENTS

EP    1363335 A2    11/2003

(Continued)

OTHER PUBLICATIONS

Marchant, A: "Optical Recording:A Technical Overview"; Addison-Wesley Publishing Company,1990, Chapter 4, pp. 67-100.

(Continued)

*Primary Examiner* — Van Chow (57) ABSTRACT

A recording device for recording data on a rewritable optical record carrier (11). The device comprises recording means (21, 22, 25) for forming marks on the record carrier during recording operations by irradiating the record carrier with a radiation beam (24), the marks representing the data. Further, the device comprises control means (20) for controlling the recording operations and beam control means (31) for controlling a write power of the radiation beam with reference to an optimum write power by changing the write power within a predetermined write power range around the optimum write power for subsequent write cycles, each of the write cycles comprising at least one recording operation. Variation of the write power improves the overwrite quality, in particular, in the management area, such as the file system area.

19 Claims, 3 Drawing Sheets

U.S. PATENT DOCUMENTS

2004/0170095 A1     9/2004   Hendrickson et al.
2005/0163008 A1*    7/2005   Mamiya et al. ............ 369/47.53

FOREIGN PATENT DOCUMENTS

| | | |
|---|---|---|
| EP | 1403355 A1 | 3/2004 |
| JP | 2004080058 A | 3/2004 |
| WO | WO03046896 A2 | 6/2003 |

OTHER PUBLICATIONS

International Search Report of International Application No. PCT/IB2006/054334 Contained in International Publication No. WO2007/060593.

Written Opinion of the International Searching Authority for International Application No. PCT/IB2007/060593.

* cited by examiner

APPARATUS FOR AND METHOD FOR RECORDING DATA ON A REWRITABLE OPTICAL RECORD CARRIER

The invention relates to a recording apparatus for recording data on a rewritable optical record carrier, which apparatus comprises:
  recording means for forming marks on the record carrier during recording operations by irradiating the record carrier with a radiation beam, the marks representing the data, and
  control means for controlling the recording operations, the control means comprising optimum power control means for determining an optimum write power of the radiation beam in dependence on characteristics of the record carrier.

The invention further relates to a method of recording data on a rewritable optical record carrier comprising forming marks on the record carrier during recording operations by irradiating the record carrier with a radiation beam, the marks representing the data, the method further comprising determining an optimum write power of the radiation beam in dependence on characteristics of the record carrier.

The invention also relates to a computer program product for use in recording data on a rewritable optical record carrier.

Rewritable optical recording media are well known to a man skilled in the art of optical recording of digital data, for example from numerous books, such as "*Optical recording: a technical overview*" by Alan B. Marchant, ISBN 0-201-76247-1. Such media, like DVD+RW, Blu-Ray and other, are capable of storing large amount of data of different types. They can be used in different environments having specific requirements as for organization of data on a recording medium. Typically, data are organized into files in accordance with rules of a particular file system. Such file system has its own file system data, which include information about all kind of structures relating to (user) data stored on a recording medium. In particular, file system data may include volume structures representing the structures of logical and/or physical volumes, file entries representing the structures of files containing the data, directory entries describing grouping of files, and a space bitmap representing allocated or unallocated space for storing data on a recording medium. A recording medium may comprise addressable recording units for storing the data. At a level of a file system those units are referenced to with use of logical addresses defining a contiguous addressing (storage) space to be used for storing sequences of information blocks, such as files under control (according to rules) of the file system, for example UDF. Commonly, the file system data and the data they relate to, such as the user data, are stored at separate, dedicated areas on a record carrier.

The UDF specification defines file system data to reside in the same logical block addresses on the medium. These file system data are updated with each data write operation, resulting in a greater frequency of rewrites to the file system data areas compared with the user data storage areas of the optical medium. The file system data on a rewritable optical record carrier, such as a DVD+RW/-RW, is overwritten with almost the same data after every recording, especially in an Audio/Video (A/V) recorder.

The file system data are also updated (overwritten) a lot more often than the data they relate to, for example the user data. The quality of recording in the file system area starts deteriorating rapidly after a few hundred overwrites. Hence, at present the number of overwrites that can be achieved is determined by the file system area. The limited number of possible overwrites of the medium gives rise to a special class of defects referred to as Direct-Over-Write (DOW) defects. The same problem may also appear in other areas on a rewritable optical record carrier, particularly in case the same data is many times recorded in the same area at the same location. However, this problem is certainly most severe in the file system area, or more general, in a management area where some particular location is often repeatedly overwritten.

The United States patent application publication US 2004/0170095 discloses a method and a system for reconditioning optical storage media to write updated information. The writing of random information is proposed to recondition commonly used portions of the optical medium before rewriting information to those portions of the optical medium, in order to extend the service life of a rewritable optical medium. For instance, a stored file system structure of an optical medium, such as a UDF random writable file system, is updated by reading to a buffer the structure from the optical medium, overwriting the structure on the medium with random information to recondition transitions between data points of the structure, updating the file system structure in the buffer and writing the updated file system structure over the random information. It should be noted that this method effectively teaches to rewrite a specific portion of the medium twice, first with random data and then with the updated data.

It is an object of the present invention to provide a way of recording data on a rewritable optical record carrier, by which the DOW quality can be improved significantly in a more effective and simple way.

This object is achieved, according to a first aspect of the invention, by a recording apparatus of the type described in the opening paragraph, the control means comprising beam control means for controlling a write power of the radiation beam with reference to the optimum write power by changing the write power within a predetermined write power range around the optimum write power for subsequent write cycles, each of the write cycles comprising at least one recording operation.

Varying the write power gives a sense of randomness over different recordings and improves the overwrite quality. Thus, contrary to the known methods, not the optimum write power value is used continuously for writing data in subsequent write cycles; the write power value is changed for subsequent write cycles to provide some randomness to effects on the record carrier representing the data recorded.

In an embodiment of the recording apparatus, the optimum power control means are for monitoring formation of the marks during the recording operations and for adjusting the optimal write power in dependence on the monitoring. This makes it possible to combine changing of the write power to improve the DOW quality with so-called "running" optimum power calibration.

In another embodiment of the recording apparatus, the beam control means are for determining the write power range in dependence on allowable values of at least one parameter describing quality of recorded data. This ensures that the recording quality is maintained for the write power values within the range.

In a further embodiment of the recording apparatus, the beam control means are for changing the write power within the write power range of ±10% around the optimum write power. This allows to simultaneously keep jitter and BLER of recorded data close to their minima.

There are different possibilities for varying the power of the radiation beam for recording data. In a further embodiment of the recording apparatus, the beam control means are for changing the write power by randomly selecting a value from the write power range, thus improving randomness of recordings.

According to another embodiment, the beam control means are for changing the write power by selecting a value from a set of discrete values of the write power. This allows for a simple lookup table to be employed in changing the write power.

In yet another embodiment of the recording apparatus, the beam control means are for changing the write power stepwise within the write power range. This makes it possible, for example, to change the write power each time by a fixed amount.

As mentioned above, the invention can be generally applied for recording of any kind of data. Nevertheless, a special case exists, when the record carrier comprises a program area for recording the user data and a management area for recording the management data related to the user data. These management data are updated/overwritten more often than the user data leading to optical medium failure even though data storage areas, such as the program area, which have not experienced as frequent rewrites, are able to support additional rewrites. Therefore, in an embodiment of the recording apparatus, the beam control means are for changing the write power only for recording the management data.

Commonly, the data are organized in information blocks and comprise at least one data file under a file system, the information blocks are grouped into at least one error correction code block, and the record carrier comprises addressable locations for recording the information blocks. In a further embodiment of the recording apparatus, the beam control means are for changing the write power for the at least one recording operation comprising recording of at least one of the following:
 the at least one data file;
 the at least one error correction code block;
 at least one of the information blocks.

This provides extra flexibility to the way the write power is changed. For example, it can be changed for recording of every information block, or for recording of an error correction block, or for recording a complete data file.

In another embodiment of the recording apparatus, the beam control means are for changing the write power only for recording file system data related to the user data, the management area comprising a file system area for storing the file system data. This allows for selectively changing the write power in the most sensitive areas on commonly used record carriers.

According to a second aspect of the invention a method of recording data on a rewritable optical record carrier of the type described in the opening paragraph is provided, the method comprising controlling a write power of the radiation beam with reference to the optimum write power by changing the write power within a predetermined write power range around the optimum write power for subsequent write cycles, each of the write cycles comprising at least one recording operation.

According to a third aspect of the invention a computer program product for use in recording data on a rewritable optical record carrier of the type described in the opening paragraph is provided, the computer program comprising program code means for causing a processor of a recording apparatus, to perform the method as described in relation to the second aspect of the invention.

Further preferred embodiments of the apparatus and method according to the invention are given in the appended claims, disclosure of which is incorporated herein by reference.

These and other aspects of the invention will be apparent from and elucidated further with reference to the embodiments described by way of example in the following description and with reference to the accompanying drawings, in which.

Corresponding elements in different Figures have identical reference numerals.

Figure 1A:
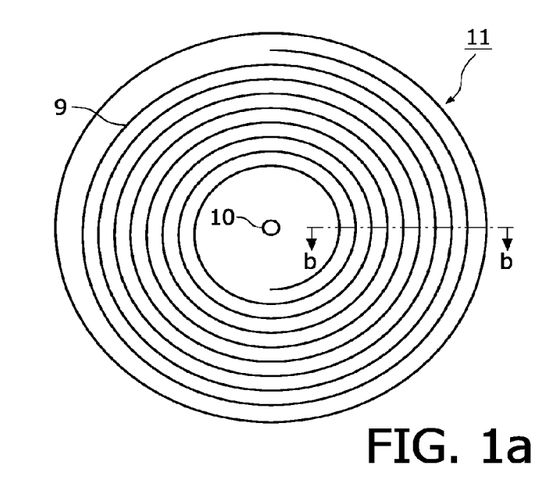
FIG. 1a shows a recording medium (top view)

FIG. 1a shows an example of a recording medium 11 having a form of disc with a track 9 and a central hole 10. The track 9, being the position of the series of (to be) recorded marks representing information (data), is arranged in accordance with a spiral pattern of turns constituting substantially parallel tracks on an information layer. The recording medium may be optically readable, called an optical disc, and has an information layer of a recordable type. Examples of a recordable disc are the CD-RW, and writable versions of DVD, such as DVD+RW, and the high density writable optical disc using blue lasers, called Blu-ray Disc (BD). The information is represented on the information layer by recording optically detectable marks along the track, for example crystalline or amorphous marks in phase change material. The track 9 on the recordable type of recording medium is indicated by a pre-embossed track structure provided during manufacture of the blank recording medium. The track structure is constituted, for example, by a pregroove 14, which enables a read/write head to follow the track during scanning. The track structure comprises position information including so-called physical addresses, for indicating the location of units of information, usually called information blocks or packets. The position information includes specific synchronizing marks for locating the start of such information blocks.

Figure 1B:
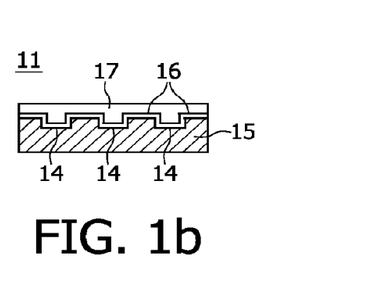
FIG. 1b shows a recording medium (cross section)

FIG. 1b is a cross-section taken along the line b-b of the recording medium 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

Figure 2:
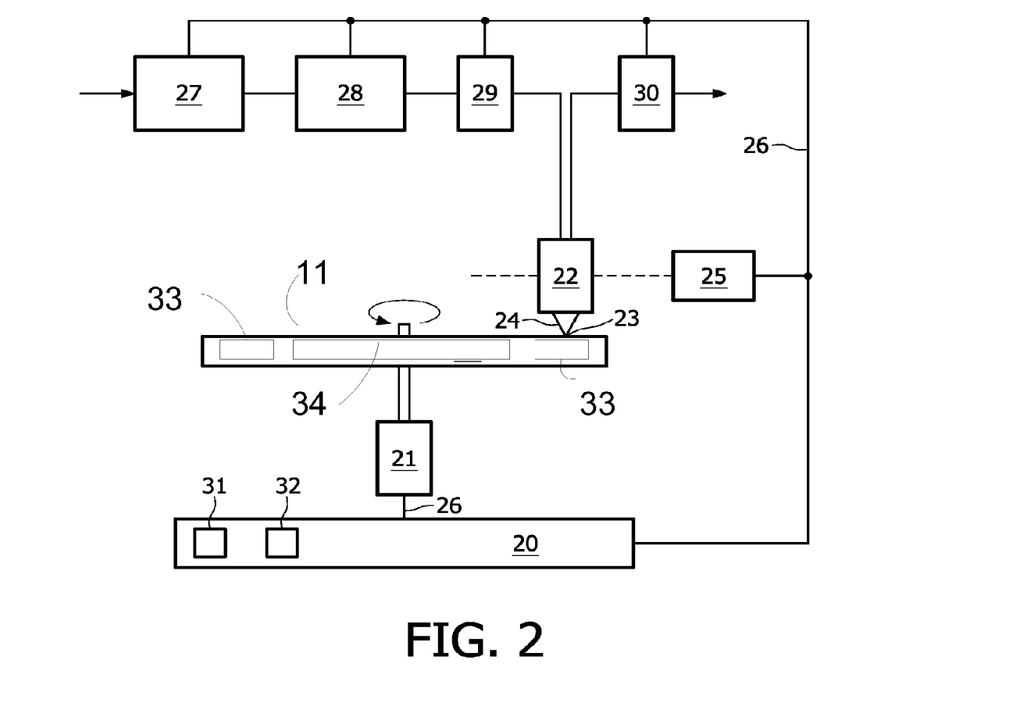
FIG. 2 shows a recording apparatus, in accordance with the invention.

FIG. 2 shows an example of a recording apparatus for recording information on a recording medium 11 such as CD-RW, DVD+RW or BD, in accordance with the invention. The apparatus is provided with writing means for scanning the track on the recording medium, which means include a drive unit 21 for rotating the recording medium 11, a head 22, and a positioning unit 25 for coarsely positioning the head 22 in the radial direction on the track. The head 22 comprises an optical system of a known type for generating a radiation beam 24 guided through optical elements focused to a radiation spot 23 on a track of the information layer of the recording medium. The radiation beam 24 is generated by a radiation source, for example a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, for example in the form of areas with a reflection coefficient different from their surroundings, obtained when recording in materials such as dye, alloy or phase change material, or in the form of areas with a direction of magnetization different from their surroundings, obtained when recording in magneto-optical material. For reading, the radiation reflected by the information layer is detected by a detector of a usual type, for example a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve information (data). Hence retrieving means for reading information include the drive unit 21, the head 22, the positioning unit 25 and the read processing unit 30. The apparatus comprises write processing means for processing the input information to generate a write signal to drive the head 22, which means comprise an (optional) input unit 27, and modulator means comprising a formatter 28 and a modulator 29. During the writing operations, marks representing the information are formed on the record carrier. The marks are formed by means of the spot 23 generated on the recording layer via the radiation beam 24, usually from a laser diode. Digital data is stored on the record carrier according to a predefined data format. Writing and reading of information on/from optical disks and formatting, error correcting and channel coding rules are well-known in the art, for example from the CD and DVD systems. The input unit 27 processes input data to units of information, which are passed to the formatter 28 for adding control data and formatting the data, for example by adding error correction codes (ECC) and/or interleaving. For computer applications units of information may be interfaced to the formatter 28 directly—in such case, as an option, the input unit 27 does not have to be present in the apparatus. The formatted data from the output of the formatter 28 is passed to the modulation unit 29, which comprises for example a channel coder, for generating a modulated signal, which drives the head 22. Further the modulation unit 29 comprises synchronizing means for including synchronizing patterns in the modulated signal. The formatted units presented to the input of the modulation unit 29 comprise address information and are written to corresponding addressable locations on the recording medium under the control of a control unit 20. The control unit 20, which controls the recording and retrieving of information, may be arranged for receiving commands from a user or from a host computer. The control unit 20 is connected via control lines 26, for example a system bus, to said input unit 27, formatter 28 and modulator 29, to the read processing unit 30, to the drive unit 21, and to the positioning unit 25. The control unit 20 comprises control circuitry, for example a microprocessor, a program memory and control gates, for performing the procedures and functions according to the invention as described below. The control unit 20 may also be implemented as a state machine in logic circuits.

In an embodiment of the apparatus, the control unit 20 is arranged for controlling the recording by locating each block at a physical address in the track. Physical addresses are translated into logical addresses and vice versa. The logical addresses constitute a contiguous data storage space to be used for storing sequences of information blocks, such as files under control of a file management system, for example UDF. Such file system has its own file system data, which include information about all kind of structures relating to user data stored on a recording medium. In particular, file system data may include volume structures representing the structures of logical and/or physical volumes, file entries representing the structures of files containing the user data, directory entries describing grouping of files, and a space bitmap representing allocated or unallocated space for storing data on a record carrier. It should be pointed out that file entries may also contain references to other file entries.

Information blocks can be grouped into larger units. For example, in the DVD system, 16 information blocks each of 2 Kbytes of data are grouped into so-called ECC blocks of 32 Kbytes, for the purpose of error correction.

In an embodiment, the apparatus is a storage system only, for example an optical disc drive for use in a computer. The control unit 20 is arranged to communicate with a processing unit in the host computer via a standardized interface (not shown). File system data are generated by the processing unit and recorded on the record carrier under control of the control unit 20. Digital data (comprising the user data and/or file system data) are interfaced to the formatter 28 and from the read processing unit 30 directly. In this case, the interface acts as an input unit and an output unit; as an option, the input unit 27 does not have to be present in the apparatus.

In an embodiment, the apparatus is arranged as a stand alone unit, for example a video recording apparatus for consumer use. The control unit 20, or an additional host control unit included in the apparatus, is arranged to be controlled directly by the user, and to perform the functions of the file system(s). The apparatus includes application data processing, for example audio and/or video processing circuits. User information is presented on the input unit 27, which may comprise compression means for input signals such as analog audio and/or video, or digital uncompressed audio/video. The read processing unit 30 may comprise suitable audio and/or video decoding units.

The control unit 20 includes a beam control unit 31 and an Optimum Power Control, OPC, unit 32. The beam control unit 31 is for controlling parameters of the radiation beam 24 during recording and reading operations. Parameters of the radiation beam, used to create the marks on the recording medium, include its write power and pulse shape defined with reference to the write power; the choice of a particular pulse shape depending on a so-called write strategy. The beam control unit 31 controls the write power of the radiation beam 24 with reference to an optimum write power. The optimum write power for a particular recording medium is determined by the OPC unit 32. For example, it can be retrieved from a table, listing optimum write power values for different recording media, stored in the recording apparatus or from the medium itself.

In order to avoid that the DOW quality, in particular in the management area, deteriorates rapidly after many overwrites caused by writing new data a plurality of times, the optimum write power level is not used as a fixed value for the write power, in particular for recording the file system data, but the write power is varied for subsequent write cycles. Thus, deliberately, the write power is not kept at the value as determined by, for example, calibration procedures described below. This improves much the DOW quality, in particular in the file system area, without causing the recording quality to decrease significantly.

The beam control unit 31 is for changing the write power within a range around the optimum write power, for subsequent write cycles. Each write cycle consists of one or more recording operations. In particular, a recording operation may comprise at least recording of:
- a number of data files, or
- a single data file, or
- a number of ECC blocks, or
- a single ECC block, or
- a number of information blocks, or
- a single information block.

Thus, for example, the write power can be changed just before or after recording a data file, or an ECC block, or a single information block, or even continuously during any recording operation. This gives flexibility in adjusting a frequency of the write power changes in order to improve the DOW quality optimized against, for example, overwriting properties of the record carrier and/or overall performance of the recording apparatus.

In an embodiment, the beam control unit 31 is for changing the write power periodically, for example every time after a number of recording operations. This number can be random or predefined, for example the write power can be changed once in 10 recordings.

In a further embodiment the beam control unit 31 is for varying the write power for each new write cycle. However, generally, it would also be sufficient to vary the write power each time that a certain number of write cycles has passed.

It should be pointed out here, that the function of changing the write power within the range around the optimum write power is different from maintaining the write power at a desired level, which may require small adjustments of its value, for example based on some feed-back mechanisms.

The limits of the range of the write power can be determined in dependence on parameters representing quality of the recorded data. Examples of commonly used such parameters are jitter and Block Error Rate, BLER. Jitter is a measure of variation of (relative) lengths of the marks on the record carrier, whereas BLER demonstrates the number of errors during processing of the recorded data. In case of DVD discs, BLER is also known as "PI Sum 8", which is a moving average sum of the Parity Inner errors over 8 ECC blocks.

In embodiment, the beam control unit 31 is for determining the range of the write power in dependence on allowable values of at least one parameter describing quality of the recorded data. For example, for the DVD disc, the range can be determined under the condition that jitter is lower than 9% for all values of the write power within the range. In another example, the range is determined for BLER lower than 280, for the DVD disc.

Preferably, the limits of the range lie within ±10% of the optimum write power. This can be seen from the graph shown in FIG. 3. Said graph illustrates dependence of jitter and BLER, on the write power in arbitrary units. These two commonly used parameters should be at their minima to ensure the best recording quality. As can be seen, a variation of the write power within ±10% around the optimum write power does neither change jitter nor BLER significantly. In the example presented in FIG. 3, the optimum write power is 464; the value range ±10% is then from 418 to 510.

Figure 3:
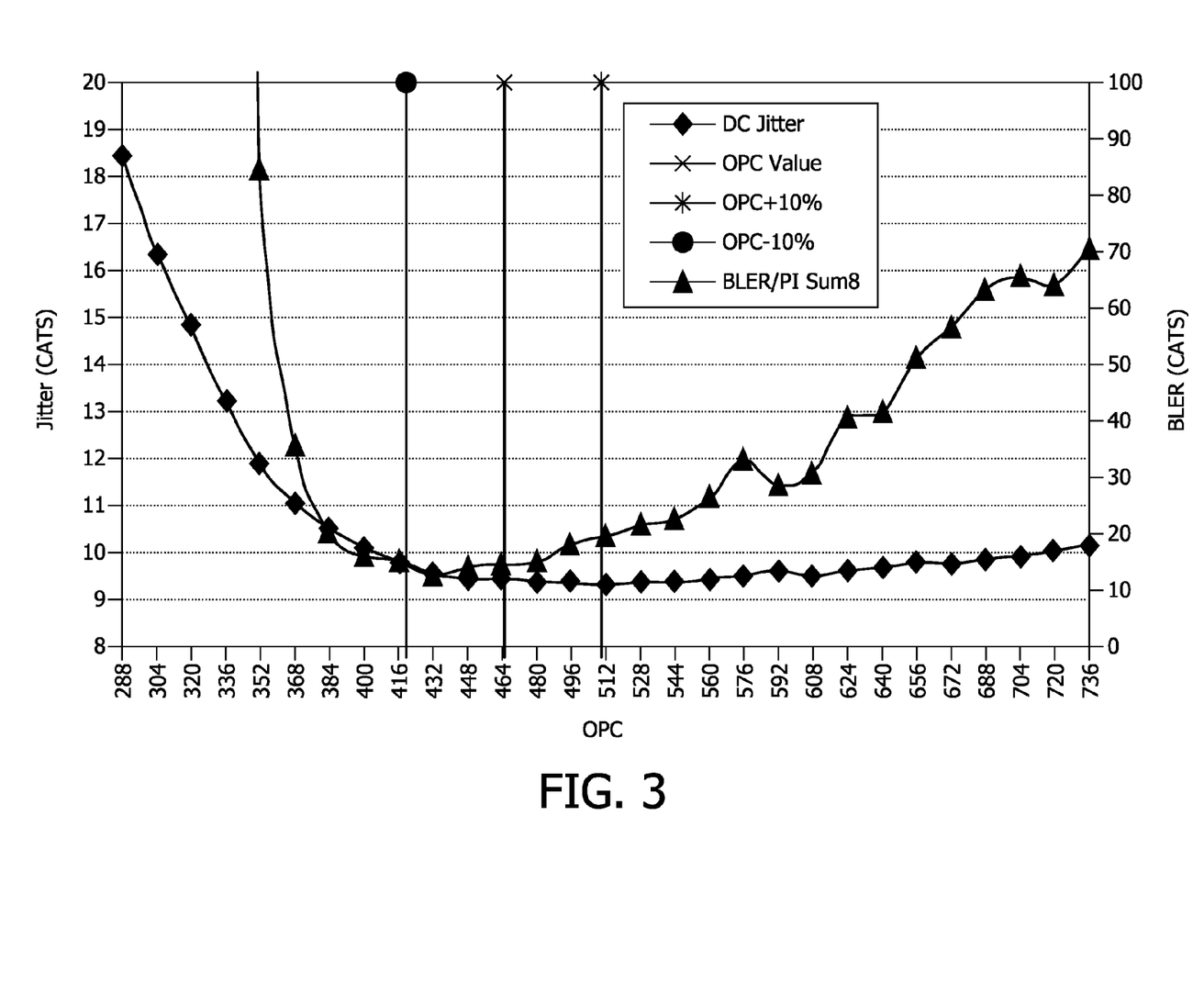
FIG. 3 shows a graph illustrating the dependence of jitter and block error rate on the write power.

It should be noted that the range of values of the write power does not have to be symmetric around the optimum write power, for example values between 430 and 480 or even between 430 and 464 (that means always lower than the optimum write power) can be used in case of dependence in FIG. 3.

In an embodiment, the beam control unit 31 changes the write power by randomly selecting a value from the range around the optimum write power. For example, a particular value can be selected from a set of discrete values of the write power. Alternatively, the beam control unit 31 can change the write power stepwise within the allowed range. For example, the write power can be increased/decreased by a fixed fraction of the optimum write power, for subsequent write cycles.

The beam control unit 31 can be adapted for changing the write power only for recording management data for cases when the data comprises user data and management data related to the user data, while the record carrier comprises a program area 34 for recording the user data and a management area 33 for recording the management data. In this embodiment of the recording apparatus, no change of the write power is performed for recording the user data. That means, either the optimum write power, or the write power as applied in a preceding recording operation of the management data, is used.

In another embodiment of the recording apparatus, the beam control unit 31 is for changing the write power only for recording the file system data, in particular file and/or directory entries.

The data updated in the management area are not random. However, varying the power as proposed according to the present invention simulates randomness to achieve a high overwrite capacity on the record carrier. The particular kind of variation of the power used in the management area is not fixed, that means there are different embodiments possible for varying the power used for recording the management data, in particular the file system data. For instance, the power used for writing the management data can be randomly chosen from a set of values defined relative to the optimum write power, OWP, for example (OWP−10%, OWP, OWP+10%). Alternatively, the power used can be randomly chosen for each new write cycle or can be stepwise changed within the allowed write power range around the optimum write power value. In total, the proposed variation of the write power, specifically in the management area, will allow for example the phase-change material of a rewritable optical record carrier to last for more overwrites compared to conventional recording methods.

In an embodiment of the recording apparatus, the OPC unit 32 is for determining the optimum write power in dependence on characteristics of the medium and the recording speed by employing the so-called optimum power calibration process.

The OPC algorithm employed by the OPC unit 32 in determining the optimum write power, may use, for example, the following parameters:

For the medium:
  the sensitivity of the recording layer to a laser write power at a given wavelength;
  the change in the sensitivity, when the laser wavelength is changed;
  the marks formation mechanism in the recording layer, which is dependent on the applied layer technology.

For the recording apparatus:
  the dimensions and optical quality of the laser light spot at the recording layer; the applied write strategy (for example, the pulse shape);
  the actual wavelength of the laser, when performing the recording on the medium. This wavelength depends on, for example: the type of laser, the spread in wavelength for each individual laser of this type, the actual write power and/or the temperature of the laser.

In an embodiment, the OPC unit 32 is for performing the optimum power calibration only once, after the first insertion of the medium into the recording apparatus.

However, after this calibration, the optimum write power may change because of, for example:

power sensitivity fluctuation over the medium;

wavelength shift of the laser due to change in operating temperature;

change of spot aberrations due to change in, for example, the medium skew, substrate thickness and/or defocus;

changed conditions of the medium and/or optics, when the calibration was carried out a long time before the actual recording.

Therefore, in another embodiment, the OPC unit 32 is for monitoring formation of the marks during the recording operations and for adjusting the optimal write power in dependence on the monitoring, in the so-called running optimum power calibration. This procedure is based on the measured reflectivity during recording and is intended to give robust recording in the presence of disc defects, such as fingerprints or black dots. In this case, the beam control unit 31 changes the write power with reference to the adjusted optimal write power.

In addition, the OPC unit 32 can calculate set points and limits of the write power, used in the running optimum power calibration, analogously to the ways of changing the write power described above. For example, the limits of the write power used in the running optimum power calibration algorithms, can be calculated by randomly choosing values from the range defined with reference to the optimum write power determined initially, or defined with reference to the write power currently used for recording.

Figure 4:
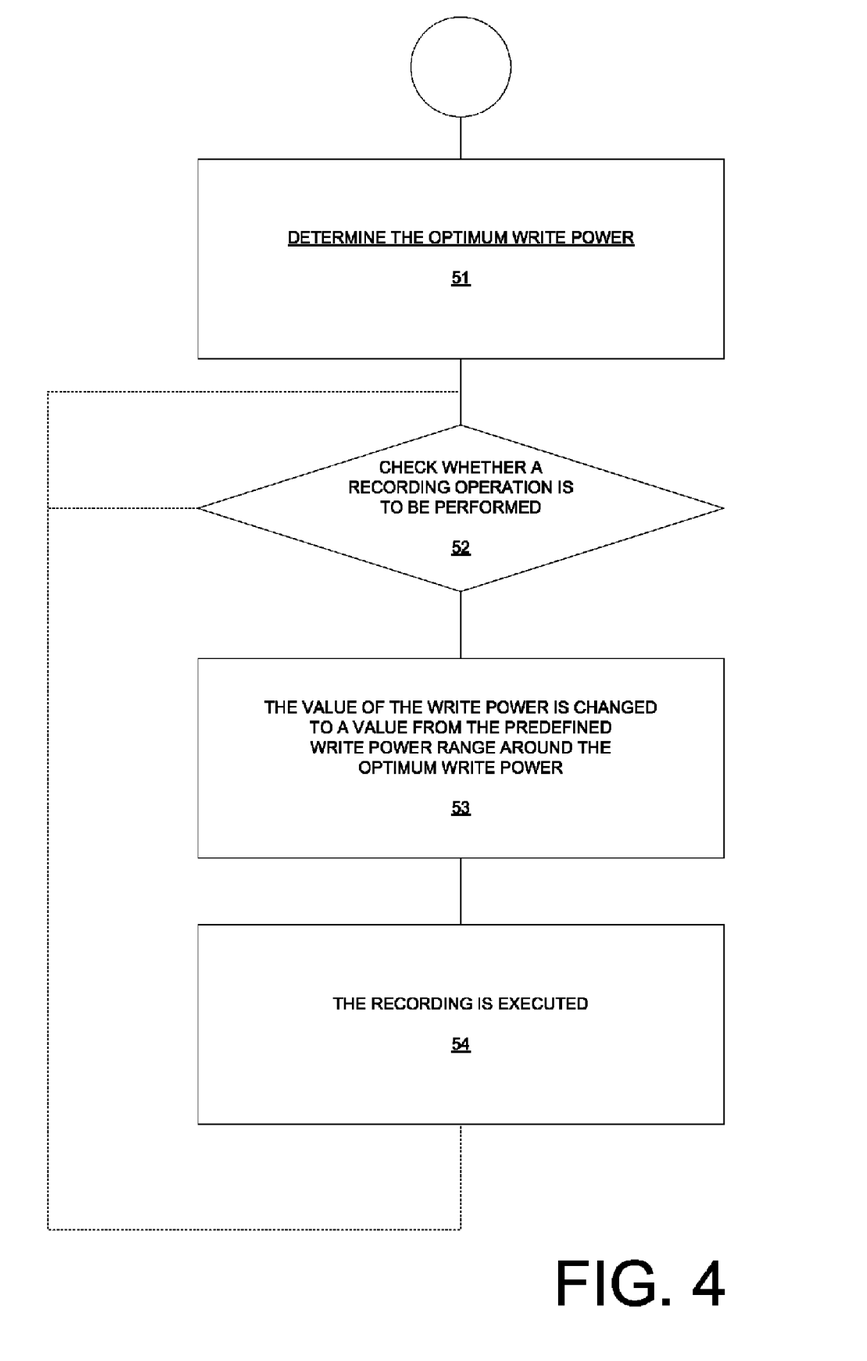
FIG. 4 shows a method of recording data on a rewritable optical record carrier, in accordance with the invention.

FIG. 4 shows an example of a method performed by the control unit 20, the beam control unit 31 and the optimum power control unit 32. First, in a step 51, the optimum write power is determined as described with reference to embodiments of the recording apparatus. Next, in a step 52, it is checked whether a recording operation is to be performed. Then, if this is the case, a value of the write power is changed to a value from the predefined write power range around the optimum write power, in a step 53. Consequently, in a step 54, the recording is executed.

In an embodiment of the method, the steps 53 and 54 are interchanged, that is the write power is changed right after completion of the recording, so its new value can be applied to a future recording operation.

In another embodiment of the method, the steps 53 and 54 are combined together, so, for example, the write power is changed during the recording operation. This change may be continuous.

In a further embodiment of the method, the step 51 is executed after the step 52 or after the step 53 in order to combine changing of the write power to improve the DOW quality with the running optimum power calibration.

As mentioned above, the optimum write power can also be adjusted during the recording—the steps 51 and 54 are combined together, in this case.

In an embodiment of the method, the step 53 is modified so the write power is changed only for specific recording operations. For example, the write power is changed for every n-th recording operation, where "n" is a predefined natural number. Alternatively, the beam control unit 31 can perform the change of the write power at random.

In an embodiment of the method, the step 52 is modified to check whether the data to be recorded are the management data, in particular the file system data, and the step 53 is executed only for recording operations of the management data.

Other embodiments of the method correspond to functionalities of the beam control unit 31 and/or the optimum power control unit 32 as described with reference to embodiments of the recording apparatus.

In an embodiment of the apparatus the control unit 20 and/or the functions of controlling the write power and/or the determining the optimum write power are implemented in a software program. The software program running in suitable processor is controlling the execution of the recording process. The software program may be a executable file to be entered in the storage device, for example in the form of an update of the software already present in a program memory, like EPROM flash memory, in the storage device.

An embodiment of a computer program product according to the invention is operative to cause the control unit 20 to perform methods and functions as described in reference to embodiments of the recording apparatus presented above.

Whilst the invention has been described with reference to preferred embodiments thereof, it is to be understood that these are not limitative examples. Thus, various modifications may become apparent to those skilled in the art, without departing from the scope of the invention, as defined by the claims and the embodiments. Further, the invention lies in each and every novel feature or combination of features described above. It is noted, that the invention may be implemented by means of a general purpose processor executing a computer program or by dedicated hardware or by a combination of both, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. A recording apparatus for recording data on a rewritable optical record carrier, which apparatus comprises:

recording means for forming marks on the record carrier during recording operations by irradiating the record carrier with a radiation beam, the marks representing the data; and control means for controlling the recording operations, the control means comprising:

optimum power control means for initially determining an optimum write power of the radiation beam prior to a first write cycle in dependence on characteristics of the record carrier; and beam control means for controlling a write power of the radiation beam with reference to the initially determined optimum write power by changing the write power from the initially determined optimum write power to a randomly selected optimal or non-optimal value from a range around the initially determined optimum write power for said subsequent write cycles, each of the write cycles comprising at least one recording operation wherein the beam control means are for changing the write power within the write power range of ±10% around the optimum write power.

2. A recording apparatus as claimed in claim 1, wherein the optimum power control means are for monitoring formation of the marks during the recording operations and for adjusting the optimal write power in dependence on the monitoring.

3. A recording apparatus as claimed in claim 1, wherein the beam control means are for determining the write power range in dependence on allowable values of at least one parameter describing quality of recorded data.

4. A recording apparatus as claimed in claim 1, wherein the beam control means are for changing the write power by randomly selecting a value from the write power range.

5. A recording apparatus as claimed in claim 1, wherein the beam control means are for changing the write power by selecting a value from a set of discrete values of the write power.

6. A recording apparatus as claimed in claim 1, wherein the beam control means are for changing the write power stepwise within the write power range.

7. A recording apparatus as claimed in claim 1, the data comprising user data and management data related to the user data, the record carrier comprising a program area for recording the user data and a management area for recording the management data, wherein the beam control means are for changing the write power only for recording the management data.

8. A recording apparatus as claimed in claim 1, the data organized in information blocks and comprising at least one data file under a file system, the information blocks grouped into at least one error correction code block, the record carrier comprising addressable locations for recording the information blocks, wherein the beam control means are for changing the write power for the at least one recording operation comprising recording of at least one of the following:
   the at least one data file;
   the at least one error correction code block;
   at least one of the information blocks.

9. A recording apparatus as claimed in claim 7, the management area comprising a file system area for storing file system data related to the user data, wherein the beam control means are for changing the write power only for recording the file system data.

10. A method of recording data on a rewritable optical record carrier comprising steps of:
   forming marks on the record carrier during recording operations by irradiating the record carrier with a radiation beam, the marks representing the data,
   determining an initial optimum write power of the radiation beam prior to the first write cycle in dependence on characteristics of the record carrier, and
   controlling a write power of the radiation beam with reference to the initially determined optimum write power by changing the write power from the initially determined optimum write power to randomly selected optimal and non-optimal write power values within a predetermined write power range around the initially determined optimum write power for said subsequent write cycles, each of the write cycles comprising at least one recording operation
   wherein the write power range is ±10% around the optimum write power.

11. A method as claimed in claim 10, comprising steps of:
   monitoring formation of the marks during the recording operations, and
   adjusting the optimal write power in dependence on the monitoring.

12. A method as claimed in claim 10, comprising a step of determining the write power range in dependence on allowable values of at least one parameter describing quality of recorded data.

13. A method as claimed in claim 10, comprising changing the write power by randomly selecting a value from the write power range.

14. A method as claimed in claim 10, comprising changing the write power by selecting a value from a set of discrete values of the write power.

15. A method as claimed in claim 10, comprising changing the write power stepwise within the write power range.

16. A method as claimed in claim 10, the data comprising user data and management data related to the user data, the record carrier comprising a program area for recording the user data and a management area for recording the management data, the method comprising changing the write power only for recording the management data.

17. A method as claimed in claim 10, the data organized in information blocks and comprising at least one data file under a file system, the information blocks grouped into at least one error correction code block, the record carrier comprising addressable locations for recording the information blocks, the method comprising changing the write power for the at least one recording operation comprising recording of at least one of the following:
   the at least one data file;
   the at least one error correction code block;
   at least one of the information blocks.

18. A method as claimed in claim 16, the management area comprising a file system area for storing file system data related to the user data, the method comprising changing the write power only for recording the file system data.

19. A computer program product in one or more non-transitory computer-readable storage media, comprising program code means that, when executed by a computer, causes the computer to perform actions of:
   forming marks on the record carrier during recording operations by irradiating the record carrier with a radiation beam, the marks representing the data,
   determining an optimum write power of the radiation beam in dependence on characteristics of the record carrier, and
   controlling a write power of the radiation beam with reference to the initially determined optimum write power by changing the write power from the initially determined optimum write power to randomly selected optimal and non-optimal write power values within a predetermined write power range around the initially determined optimum write power for said subsequent write cycles, each of the write cycles comprising at least one recording operation
   wherein the write power range is ±10% around the optimum write power.

* * * * *